Sept. 22, 1953 G. R. ALDRICH ET AL 2,653,042
DEMOUNTABLE DUCT SEAL
Filed Jan. 30, 1950

INVENTORS:
GEORGE R. ALDRICH
KENNETH R. BRAGG

BY Herbert E. Metcalf
THEIR PATENT ATTORNEY

Patented Sept. 22, 1953

2,653,042

UNITED STATES PATENT OFFICE 2,653,042

DEMOUNTABLE DUCT SEAL

George R. Aldrich, Paramount, and Kenneth R. Bragg, Manhattan Beach, Calif., assignors to Northrop Aircraft, Inc., Hawthorne, Calif., a corporation of California Application January 30, 1950, Serial No. 141,226

5 Claims. (Cl. 285—129)

The present invention relates to demountable duct seals and more particularly to such a seal suitable for use across a joint in a hot air duct carrying air at relatively high temperature and pressures.

It is an object to provide an air duct seal across a duct joint that permits expansion and contraction of the duct, and that retains the seal under small misalignments in the duct.

It is another object of the present invention to provide an air duct seal across a duct joint that can be quickly removed.

In brief, the present invention provides for a seal across adjacent ends of air duct elements, each of these ends being provided with an external raised rib a short distance from the ends. A U-shaped seal ring having the legs of the U converging inwardly is placed across the joint with the end of one leg contacting the external surface of one element, and with end of the other leg contacting the other duct element. The material of the seal is preferably a compounded silica type rubber when high temperature air is ducted through the duct elements. The space between the ribs on the duct elements, is greater than the axial extent of the seal, and the seal is held in proper position by positioning members on an annular removable clamp surrounding the seal and engaging both ribs. Thus the seal is accurately positioned when the clamp is in place, but is free to move axially on one or the other of the duct element ends when the clamp is removed, thus opening the joint.

The invention can be more fully understood by reference to the drawings in which.

Figure 1:
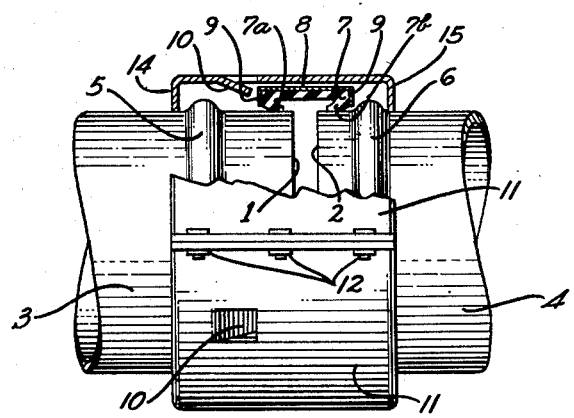
Figure 1 is a view partly in elevation and partly in section of an air duct joint embodying one preferred form of the present invention, with the seal in joint sealing position.

Referring first to Figure 1, an air duct joint is formed by abutting the ends 1 and 2 of air duct elements 3 and 4 respectively. Each air duct element 3 and 4 is provided with external annular raised ribs 5 and 6 respectively adjacent the ends thereof with, in this case, the right hand rib 6 as illustrated in Figure 1 being somewhat closer to the end 2 of the duct element 4 than is the rib 5 on the left hand duct element 3.

A seal 7 of U-shaped section is positioned across the joint formed by the two duct elements, and we prefer to space the ends 1 and 2 of the duct elements 3 and 4 to allow for expansion and contraction when the duct is being used for heated, pressurized air.

Seal 7 is preferably of a flexible material such as rubber, artificial elastic material simulating rubber, or as is preferred, of a silica type rubber, the characteristics of which are compatible with the temperature attained by the duct elements in use.

To insure a tight seal under pressure, the inwardly extending legs 7a and 7b of the seal preferably converge with one leg 7a contacting the external surface of one duct element 3 and with the other leg 7b contacting the external surface of the other duct element 4. It is preferred to back the seal 7 with a U-shaped metal ring 8 having lateral inwardly projecting sides 9 contacting the outer part only of seal legs 7a and 7b.

The seal 7 and its ring 8 are held in place across the joint by contact with the rib 6 on duct element 4 with the shortest distance between the rib 6 and the end 2 of the same duct element. The other side of the seal and metal ring assembly is positioned by a plurality of positioning members 10 pressed down from the periphery of a removable clamp 11 which may be of any quick detachable type, but here shown being in symmetrical halves held together by bolts 12.

Clamp 11 is also of U-shaped section, and the outer inwardly extending flanges 14 and 15 of the clamp fit loosely over the outside of the annular ribs 5 and 6 respectively thus preventing any excessive axial motion of the clamp.

Thus with the clamp stabilized in position, positioning members 10 on the clamp hold the seal and its metal ring 8 across the joint in one direction, the rib 6 holding the seal and ring in position in the other direction. As all fits except the fit of the seal legs 7a and 7b on the duct element ends can be loose, contraction and expansion of the duct elements can take place without destroying the effectiveness of the seal, and misalignments up to about 3° can also be tolerated without leak across the seal.

Figure 2:
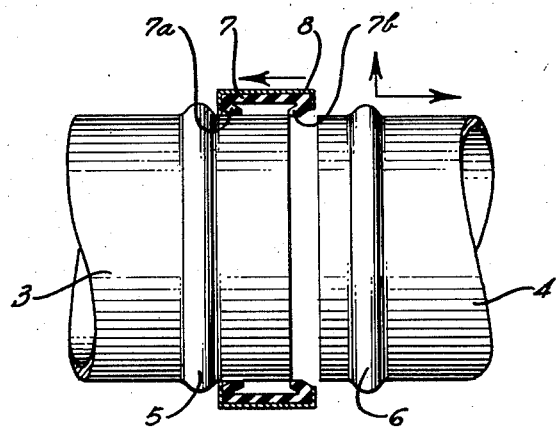
Figure 2 is a view with the duct elements in elevation but with the seal in section, after the clamp has been removed and the seal moved to one duct element to open the joint.

The sealing arrangement as above described is easily demounted, as shown in Figure 2. With the clamp 11 removed, the seal 7 and its ring 8 are merely moved axially onto the duct element 3 having the longer distance from rib 5 to the end 1 of the same duct element thereby freeing the other duct element for lateral movement. It is for this reason that it is preferred to make the distance on one duct element between the rib and the end of the duct long enough to accommodate the seal and ring assembly so that the duct elements can be moved laterally with respect to each other. If axial motion can be accomplished, the elements can be separated without movement of the seal ring. In this case, the distance of the rib from the ends of the duct elements can be the same.

The seal as above described, using silica rubber for the seal, has operated satisfactorily for ducting air at temperatures from —65° to 600° F., under pressures of from 5 p. s. i. to 125 p. s. i., in all sizes up to 6 inches in diameter. The seal has been found ideal for use in airplanes for ducts carrying cabin heating air and for carrying hot air to airplane surfaces requiring heat for de-icing purposes, for example.

While the invention has been particularly described for use across joints in hot air ducts, the seal is also useful in ducts carrying any gas or liquids that will not attack the material of the flexible seal or substantially change its elasticity.

From the above description it will be apparent that there is thus provided a device of the character described possessing the particular features of advantage before enumerated as desirable, but which obviously is susceptible of modification in its form, proportions, detail construction and arrangement of parts without departing from the principle involving or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A demountable duct seal across adjacent, aligned and spaced ends of first and second duct elements comprising an annular seal of elastic material having a U-shaped section with the legs of the U converging inwardly, the end of one of said legs contacting and making a seal against the outer periphery of the first of said duct elements, the other of said legs contacting and making a seal against the periphery of the second of said duct elements, an external raised annular and concentric rib on the first of said duct elements positioned to prevent axial movement of said seal in a direction and extent destroying the leg seal on the second duct element, a second external raised annular and concentric rib on said second of said duct elements and positioned to permit axial movement of said seal in a direction and to an extent destroying the leg seal on said first duct element, whereby the duct elements can be disassembled by lateral movements thereof only, and means mounted on said duct elements surrounding said annular seal having position members thereon extending inwardly to engage said seal to prevent axial movement of said seal along said second duct element in a direction and by an amount sufficient to destroy the leg seal on said first duct element.

2. A demountable duct seal across adjacent, aligned and spaced ends of first and second duct elements comprising an annular seal of elastic material having a U-shaped section with the legs of the U converging inwardly, the end of one of said legs contacting and making a seal against the outer periphery of the first of said duct elements, the other of said legs contacting and making a seal against the periphery of the second of said duct elements, an external raised annular and concentric rib on the first of said duct elements positioned to prevent axial movement of said seal in a direction and to an extent destroying the leg seal on the second duct element, a second external raised annular and concentric rib on said second of said duct elements and positioned to permit axial movement of said seal in a direction and to an extent destroying the leg seal on said first duct element, and a removeable clamp around said seal and positioned by engagement with each of said ribs, said clamp having positioning members thereon engaging said seal to prevent axial movement of said seal along said second duct element in a direction and by an amount sufficient to destroy the leg seal on said first duct element, said clamp being relatively slidable over said duct elements a sufficient amount to permit axial expansion and contraction of said duct elements while maintaining the same sealing relationship of said annular seal.

3. Apparatus in accordance with claim 2 wherein an annular metal backing is provided for the basal portion of the U-shaped seal, and wherein said positioning members are directed to bear against said annular backing only.

4. A demountable duct seal across adjacent, aligned and spaced ends of first and second duct elements comprising an annular seal of elastic material having a U-shaped section with the legs of the U converging inwardly, the end of one of said legs contacting and making a seal against the outer periphery of the first of said duct elements, the other of said legs contacting and making a seal against the periphery of the second of said duct elements, an external raised annular and concentric rib on the first of said duct elements positioned to prevent axial movement of said seal in a direction and to an extent destroying the leg seal on the second duct element, a second external raised annular and concentric rib on said second of said duct elements and positioned farther from its respective duct element end than is said first rib on its duct element to permit axial movement of said seal in a direction and to an extent destroying the leg seal on said first duct element, and a removeable clamp around said seal and positioned by engagement with each of said ribs, said clamp having position members thereon extending inwardly to engage the side of said seal facing said second rib to prevent axial movement of said seal along said second duct element in a direction and by an amount sufficient to destroy the leg seal on said first duct element.

5. A demountable duct seal across adjacent, aligned and spaced ends of first and second duct elements comprising an annular seal of elastic material having a U-shaped section with the legs of the U converging inwardly, the end of one of said legs contacting and making a seal against the outer periphery of the first of said duct elements, the other of said legs contacting and making a seal against the periphery of the second of said duct elements, an external raised annular and concentric rib on the first of said duct elements positioned to prevent axial movement of said seal in a direction and extent destroying the leg seal on the second duct element, a second external raised annular and concentric rib on said second of said duct elements and positioned to permit axial movement of said seal in a direction and to an extent destroying the leg seal on said first duct element, and an annular removable clamp having a U-shaped section with the legs of the U converging inwardly, the end of one of said clamp legs contacting one of said duct elements adjacent the base of the rib thereon on the side of said rib away from said spaced duct element ends, the other leg of said clamp contacting the other duct element adjacent the base of the rib on the other of said duct elements on the side of said latter rib away from said spaced duct element ends, the basal portion of said clamp joining said clamp legs around the outside of said annular seal, the basal portion of said clamp having a positioning portion thereon extending inwardly in the path of axial movement of said seal to prevent axial movement of said seal, whereby said seal is held in a position bridging the space between said duct element ends by a rib on one side thereof and by said positioning portion on the other side thereof.

GEORGE R. ALDRICH.
KENNETH R. BRAGG.

References Cited in the file of this patent

UNITED STATES PATENTS

| Number | Name | Date |
|---|---|---|
| 1,357,219 | Brewster | Nov. 2, 1920 |
| 1,541,601 | Tribe | June 9, 1925 |
| 1,876,638 | Dillon | Sept. 13, 1932 |